May 11, 1948. W. E. ECKSTEIN 2,441,401
TOY AIRCRAFT
Filed Aug. 6, 1946
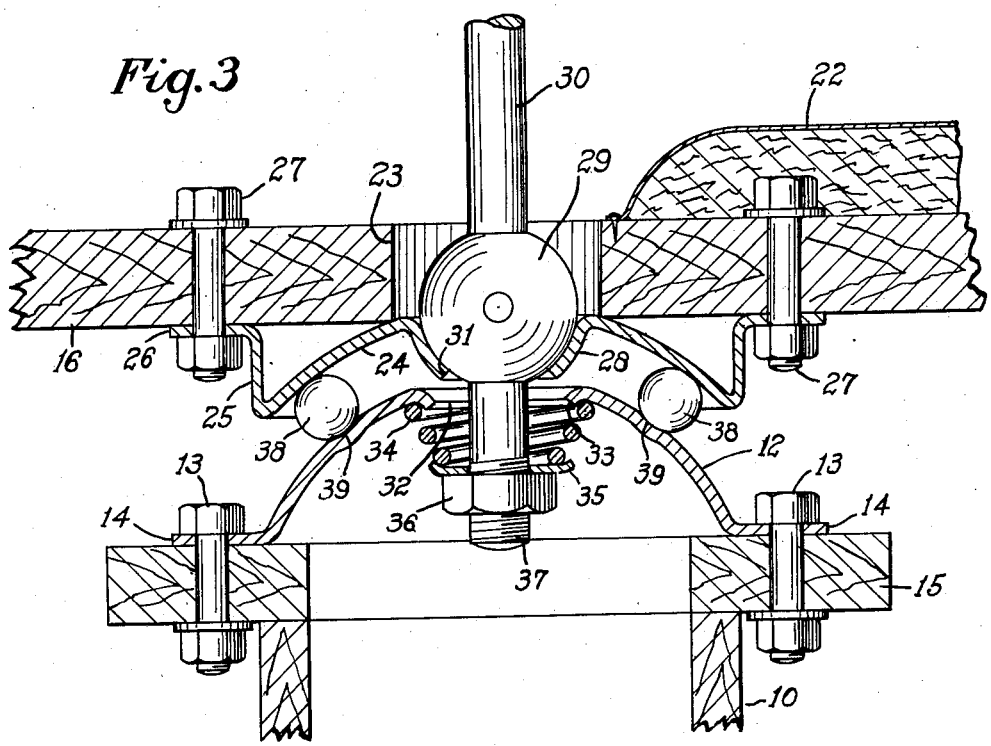
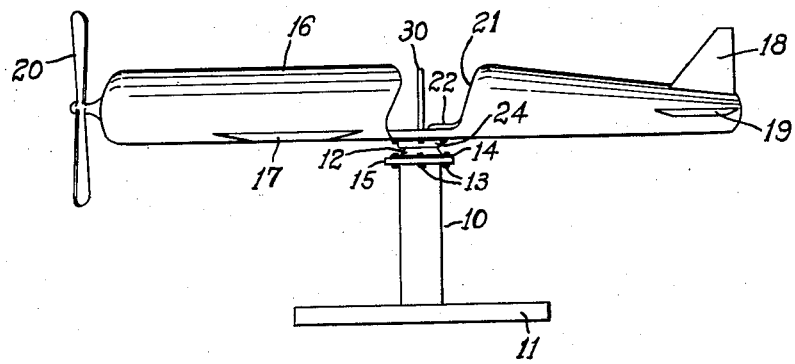
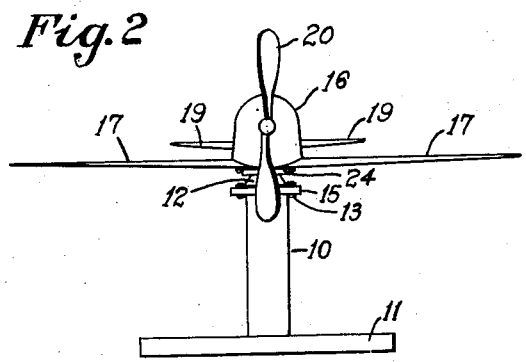
INVENTOR.
Ward E. Eckstein
BY
Frease and Bishop
ATTORNEYS Patented May 11, 1948

2,441,401

UNITED STATES PATENT OFFICE 2,441,401

TOY AIRCRAFT

Ward E. Eckstein, Salem, Ohio

Application August 6, 1946, Serial No. 688,725

4 Claims. (Cl. 272—1)

The invention relates to a device in the nature of a toy airplane, and more particularly to a pivotally supported fuselage having a seat therein for the operator and provided with a control lever by means of which the fuselage may be tilted in any direction simulating the movement of an airplane.

It is an object of the invention to provide a miniature fuselage, supported through a ball and socket joint upon an upright or pedestal, and having a control lever operatively connected to the ball and socket joint for tilting the fuselage around the support.

Another object is to provide a device of the character referred to in which the control lever is provided with resilient means for returning the fuselage to normal or horizontal position when pressure upon the lever is released.

A further object is to provide such a device in which the fuselage is supported upon the pedestal by a ball bearing comprising semi-spherical ball race carried by the pedestal and fuselage with balls interposed therebetween, a centrally located socket being provided in the ball race of the fuselage in which is seated a ball mounted upon a control lever which extends through a central opening in the ball race upon the pedestal, a coil spring being located around the lower portion of the lever and interposed between the lower ball race and a stop or shoulder on the lever.

The above objects, together with others which will be apparent from the drawing and following description, or which may be later referred to, may be attained by constructing the device in the manner hereinafter described in detail and illustrated in the accompanying drawing, in which;

Figure 1 is a side elevation of a toy aircraft embodying the invention;

Fig. 2 a front elevation of the same, and

Fig. 3 an enlarged, fragmentary sectional view of the control mechanism for the device.

The toy aircraft may be supported upon the upright indicated generally at 10, which may be in the form of a tubular pedestal as shown in the drawing, and formed of wood, metal or other suitable material, and having a base or platform 11 of sufficient size, for supporting the device upon the floor or ground.

A semi-spherical, domed or convex, ball race 12, pressed or otherwise formed of metal or the like of suitable thickness, is mounted upon the upper end of the pedestal 10 as by the bolts 13 located through the rim flange 14 of the ball race and through the flange 15 attached to the upper end of the pedestal.

The fuselage 16 may be formed of any suitable material and shaped to simulate the fuselage of an airplane, being provided with the wings 17 and with fins at its rear end simulating the rudder 18 and elevator 19 of an airplane. A propeller 20 may be attached to the front end of the fuselage to carry out the simulation of an aircraft.

A cockpit 21 is formed in the central portion of the fuselage and provided with a seat 22 for the operator. An opening 23 is formed in the bottom of the fuselage in front of said seat and located conventrically with said opening is the concave semi-spherical ball race 24 formed of metal or the like of suitable gauge having the vertical peripheral flange 25 terminating in the horizontal attaching flange 26 by means of which the ball race 24 is attached to the bottom of the fuselage as by the bolts 27.

A semi-spherical socket 28 is formed at the center of the ball race 24 and is located directly beneath the opening 23 in the bottom of the fuselage and accommodates the ball 29 which together with the socket 28 forms a ball and socket joint.

This ball is fixed upon the control lever 30 at a point spaced from the lower end of the lever, which extends down through the central opening 31 in the socket 28 and through the central opening 32 in the lower ball race 12.

The metal around the opening 32 is preferably downturned as at 33 forming a seat for the upper end of the coil spring 34, the lower end of which is fitted in the cupped washer 35 located upon the lower end of the lever and held in adjusted position as by the nut 36 threaded upon the screw threaded lower end 37 of the control lever.

Bearing balls 38 are interposed between the semi-spherical ball races 12 and 24, the lower ball race 12 being grooved or notched as at 39 to retain the balls in proper position. The upper end of the control lever 30 extends through the opening 23 in the bottom of the fuselage and up into the cockpit in convenient position to be gripped by the child sitting upon the seat 22.

In operating the toy, the control lever 30 is pressed forward, backward or to either side to tilt the fuselage in any desired direction to simulate the movement of an airplane. Assuming the control lever is pushed forward, or to the left as viewed in Fig. 3, the ball 29 will rotate in the socket 28 until the right side of the coil spring 34 is collapsed, when further movement of the control lever forward, or to the left, will rotate the ball race 24 in that direction upon the balls 38 tilting the front end of the fuselage downward.

When the pressure on the control lever is released the spring will move the parts back to the position shown in the drawing. In the same manner pressure on the control lever in any other direction will tilt the fuselage in that direction.

I claim:

1. A toy aircraft including a support, a convex, semi-spherical ball race mounted upon the top of the support, a fuselage above the support, a concave, semi-spherical ball race attached to the under side of the fuselage, bearing balls between said ball races, there being central openings in the ball races, an upright control lever located through said openings, a shoulder upon the lower end of the control lever and a coil spring located around the control lever and interposed between the convex ball race and said shoulder.

2. A toy aircraft including a support, a convex, semi-spherical ball race mounted upon the top of the support, a fuselage above the support, a concave, semi-spherical ball race attached to the under side of the fuselage, bearing balls between said ball races, there being central openings in the ball races, a socket formed in the concave ball race surrounding the central opening therein, an upright control lever located through said openings, a ball fixed upon the control lever and located in said socket, a shoulder upon the lower end of the control lever and a coil spring located around the control lever and interposed between the convex ball race and said shoulder.

3. A toy aircraft including a support, a convex, semi-spherical ball race mounted upon the top of the support, a fuselage above the support, a concave, semi-spherical ball race attached to the under side of the fuselage, bearing balls between said ball races, there being central openings in the ball races, an upright control lever located through said openings, and spring means normally holding the control lever in vertical position.

4. A toy aircraft including a support, a convex, semi-spherical ball race mounted upon the top of the support, a fuselage above the support, a concave, semi-pherical ball race attached to the under side of the fuselage, bearing balls between said ball races, there being central openings in the ball races, an upright control lever located through said openings, a socket formed in the concave ball race surrounding the central opening therein, a ball fixed upon the control lever and located in said socket, and spring means normally holding the control lever in vertical position.

WARD E. ECKSTEIN.